United States Patent [19]
Nishikawa

[11] Patent Number: 5,757,898
[45] Date of Patent: May 26, 1998

[54] INFORMATION PROCESSING AND COMMUNICATION APPARATUS

[75] Inventor: Shigeru Nishikawa, Yokohama, Japan

[73] Assignee: Canon Kabushiki Kaisha, Tokyo, Japan

[21] Appl. No.: 570,732

[22] Filed: Dec. 12, 1995

[30] Foreign Application Priority Data

Dec. 13, 1994 [JP] Japan .................. 6-332724

[51] Int. Cl.⁶ .................. H04M 1/00; G06F 15/16
[52] U.S. Cl. .................. 379/165; 379/157; 379/156; 379/93.14; 364/705.05
[58] Field of Search .................. 379/156–159, 379/164, 165, 167, 177, 242, 279, 289, 67, 387, 93.14; 364/705.05, 705.01

[56] References Cited

U.S. PATENT DOCUMENTS

| | | | |
|---|---|---|---|
| 4,995,070 | 2/1991 | Shin | 379/156 |
| 5,119,413 | 6/1992 | Okumura et al. | 379/156 |
| 5,153,908 | 10/1992 | Kakizawa et al. | 379/157 |
| 5,193,089 | 3/1993 | Tsuchida | 370/84 |
| 5,309,509 | 5/1994 | Cocklin et al. | 379/156 |
| 5,381,468 | 1/1995 | Ozawa | 379/136 |
| 5,420,918 | 5/1995 | Tsuchida | 379/352 |
| 5,483,584 | 1/1996 | Hayashi et al. | 379/156 |
| 5,581,612 | 12/1996 | Nishikawa | 379/156 |
| 5,649,005 | 7/1997 | Lynch et al. | 379/67 |
| 5,655,014 | 8/1997 | Walsh et al. | 379/242 |

*Primary Examiner*—Curtis Kuntz
*Assistant Examiner*—Paul Loomis
*Attorney, Agent, or Firm*—Fitzpatrick, Cella, Harper & Scinto

[57] ABSTRACT

Devices, such as a mouse and a keyboard, a monitor of a PC, a microphone and a speaker provided on the extension board, and a sound input/output device of the sound input/output unit which is connected to the extension board are utilized as a display unit, an operation unit, and a sound input/output unit of the key telephone, respectively, by interchanging control information between a central processing unit of a PC main device and a control unit of an extension board which includes an exchange circuit, an information processing circuit, an I/F circuit, and a telephone circuit for an extension line. Accordingly, it is possible to provide an information processing and communication apparatus, capable of controlling at least one external line and a plurality of extension lines, with superior operability, which has combined functions of a PC and a key telephone system.

18 Claims, 8 Drawing Sheets

F I G. 8
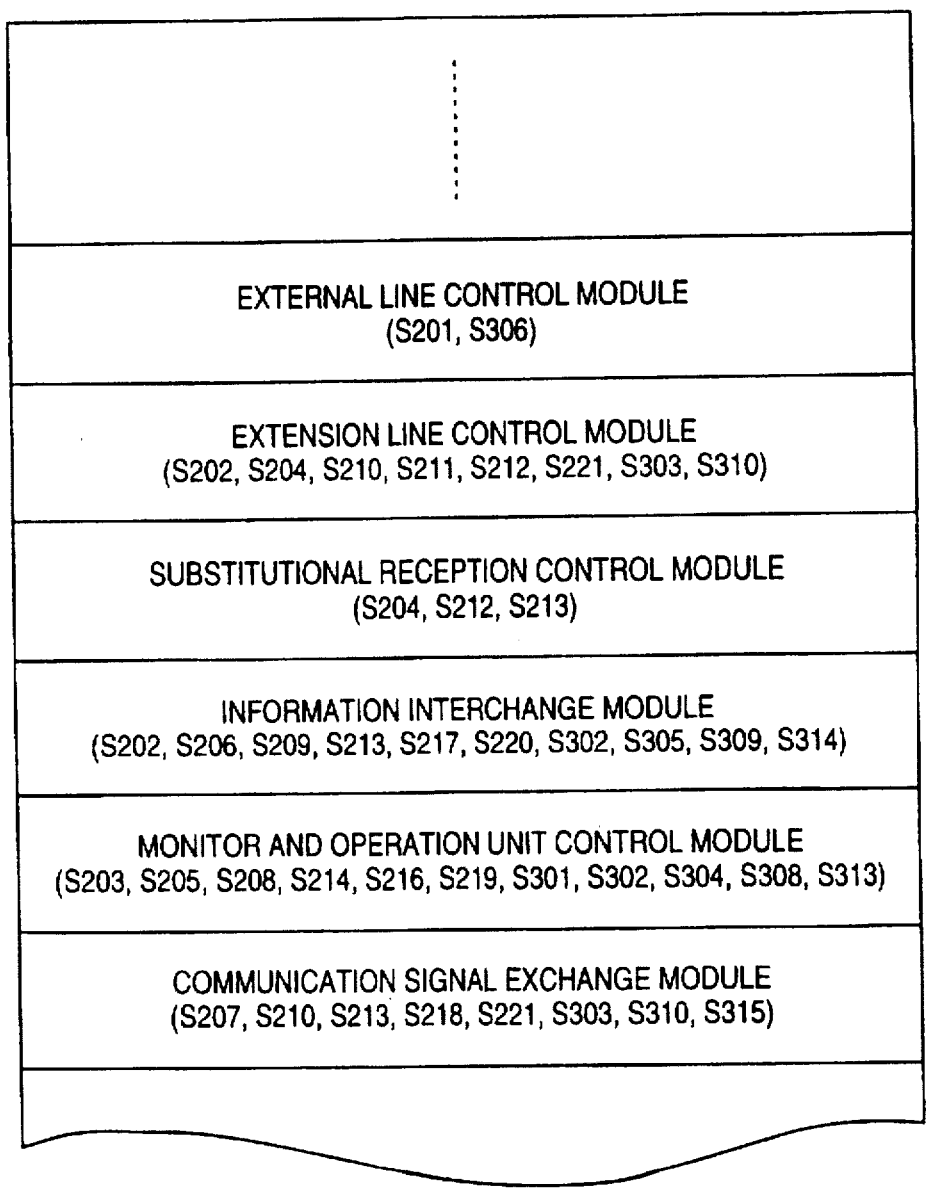

INFORMATION PROCESSING AND COMMUNICATION APPARATUS

BACKGROUND OF THE INVENTION

The present invention relates to an information communication processing apparatus and, more particularly, to an information processing and communication apparatus constructed by uniting a telephone and a personal computer (referred as "PC", hereinafter).

Telephones are necessary items in offices, accordingly, a key telephon system which includes a plurality of external lines and extension lines have been widely used, improving the operability of telephones. In addition, further improvement in operability is achieved by enlarging the size of a display of a telephone and by setting a great amount of data from a PC by connecting the PC to a telephone.

Meanwhile, PC's have also become popular and an environment that one person operating one PC can be commonly seen in offices. It is apparent that PC's have also become necessary items in offices in order to improve work efficiency.

Accordingly, a PC is sometimes treated as an individual telephone which can make a call by using its telephone directory by connecting to a telephone line so that the PC has a telephone function, or the PC is sometimes treated as a PBX (private branch exchange) by connecting to a plurality of external lines and extension lines (individual telephones).

In a case where a PC is used as an individual telephone, operability of the PC as the individual telephone is improved by using the monitor screen of the PC, a man-machine interface, such as a keyboard, and data storage and processing functions which can be used as a telephone directory. However, since only a single external line is directly connected to the PC, although types of network services differ in accordance with a kind of external line connected, the PC only provides a relatively friendly network control processing operation. Therefore, the PC could not achieve the same operability as an extension telephone of a key telephone system (i.e. key telephone), connected to a plurality of external lines and extension lines, capable of providing various kinds of service functions.

Further, in a case where a PC is treated as a PBX, the PC does not serve itself as a telephone of good operability, and only its data processing ability is used in exchanging process.

Regarding a key telephone system, there is a limit in the size of display in a key telephone. Further, because of limitations in memory capacity and man-machine interface, there arose problems that the key telephone system could not have a database function, such as a telephone directory, and a great amount of data could not be set in the key telephone system easily.

SUMMARY OF THE INVENTION

The present invention has been made in consideration of the above situation, and has its object to provide an information processing and communication apparatus which can be used as a telephone of better operability constructed by unifying a key telephone system which connects to a plurality of external lines and extension lines, and a PC having a superior man-machine interface processing ability.

It is another object of the present invention to provide an information processing and communication apparatus having more functions by connecting it to a plurality of external lines.

It is still another object of the present invention to provide an information processing and communication apparatus obtained by connecting a unit which is designed for realizing telephone functions to a PC or by providing the unit inside of a PC.

Further, it is still another object of the present invention to control any of the above information processing and communication apparatuses by installing a program for realizing telephone functions in a PC.

According to the present invention, the foregoing object is attained by providing an information processing and communication apparatus comprising a personal computer which has a pointing device, such as a mouse and keyboard, monitor, a hard disk, and a PC main unit, an extension board, and sound input/output unit used by connecting to the extension board. The extension board contains an exchange circuit, used in a main unit of a key telephone system connecting to a plurality of external lines and extension lines, an information processing circuit, I/F circuit, and a telephone circuit for one extension line. Further, an information communication processing apparatus of the present invention interchanges control information with a central processing unit of a PC main unit, and uses a pointing device, such as a mouse and a keyboard, a monitor of a PC, a microphone and a speaker provided on the extension board, and a sound input/output device of the sound input/output unit which is connected to the extension board as operation means, a display means, and sound input/output means of the key telephone, respectively.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is an example of a memory map storing program codes according to the present invention.

DETAILED DESCRIPTION OF THE PREFERRED EMBODIMENTS

Preferred embodiment of the present invention will be described in detail in accordance with the accompanying drawings.

[First Embodiment]

Figure 1:
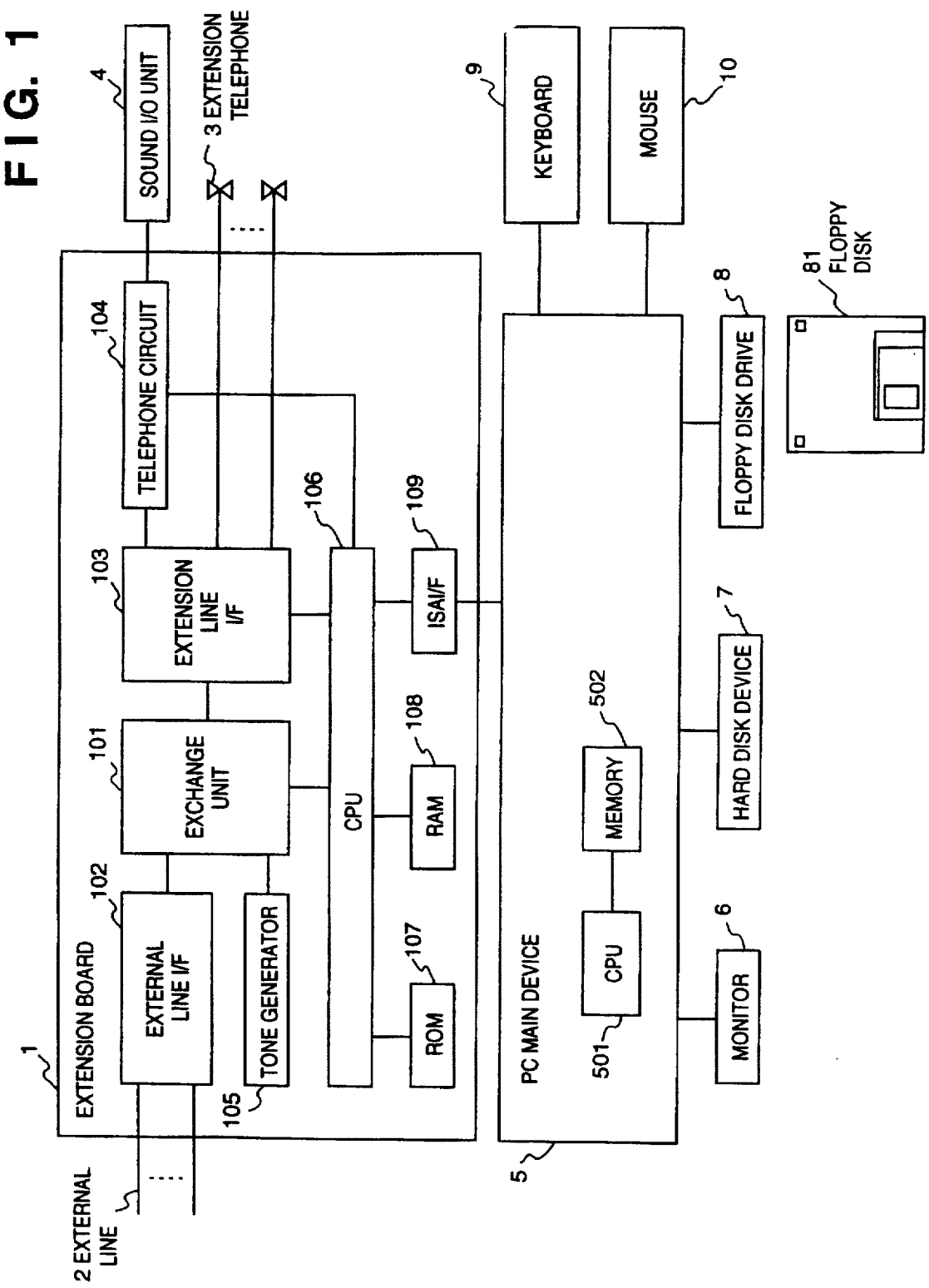
FIG. 1 is a block diagram illustrating a configuration of an information processing and communication apparatus according to a first embodiment of the present invention.

FIG. 1 is a block diagram illustrating a configuration of an information processing and communication apparatus according to a first embodiment of the present invention.

In FIG. 1, an extension board 1 contains an exchange unit 101 which is responsible for switching lines, an external line I/F 102, connected to external lines 2, for detecting arrival of a call, making a call, and controlling ON/OFF of a direct current circuit, an extension line I/F 103 connected to extension telephones 3, a telephone circuit 104 consisting of a speech circuit, a speaker, and so on, a tone generator 105 for generating signals, such as a telephone ring, a dial tone, a busy tone, and a DTMF signal, CPU 106 as a central unit of the extension board 1, which is responsible for controlling each unit and element, ROM 107 for storing a control program for the CPU 106, RAM 108 for storing various kinds of control data and information as well as serving a work area of the CPU 106 for performing various kinds of operations, and an ISA I/F 109 used for interchanging control information between a central processing unit (CPU) 501 of a PC main device 5 and the CPU 106 via an ISA bus of the PC main device 5.

A sound input/output unit 4 is connected to the telephone circuit 104, and inputs and outputs speech signals in order to use the PC as an extension telephone.

Further, a monitor 6, a hard disk device 7, a floppy disk drive 8, a keyboard 9, a mouse 10, as a pointing device, and so on, are connected to the PC main device 5. Note that the floppy disk drive 8 reads a program, stored in a floppy disk 81, which is for interchanging control information with the extension board 1 and for controlling the monitor 6, the keyboard 9, and the mouse 10 so as to be used as display means and operation means of a key telephone (the program is called as "PC control program", hereinafter), and the read program is installed in the PC.

Figure 6:
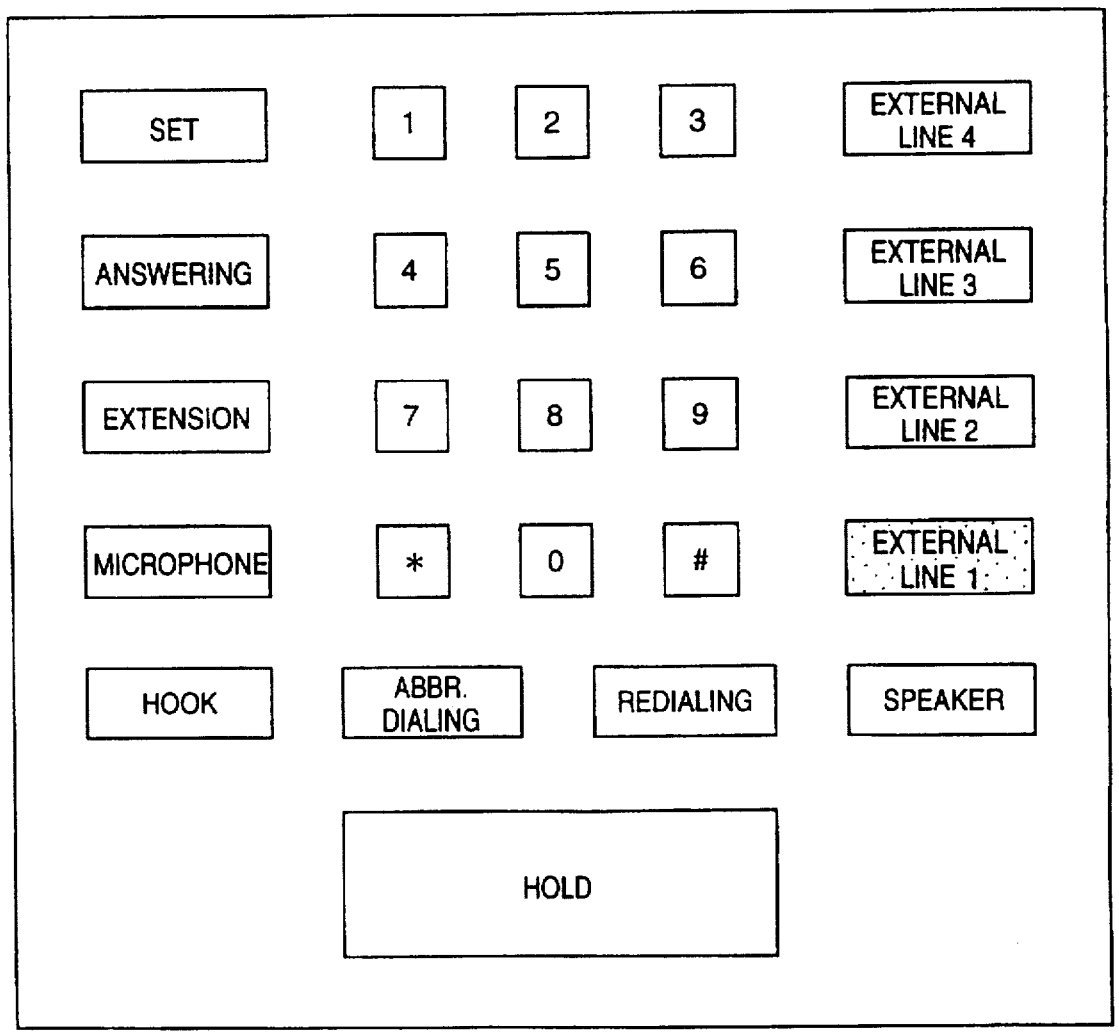
FIG. 6 is a plane view illustrating an example of a display on a monitor of the information processing and communication apparatus according to the first embodiment.

FIG. 6 is a plane view illustrating an example of a display on the monitor 6 of the information processing and communication apparatus. On the monitor 6, it is possible to display the operational state of the information processing and communication apparatus and to perform other operations by designating keys in the display, shown in FIG. 6, by using the mouse 10, for example.

Figure 2:
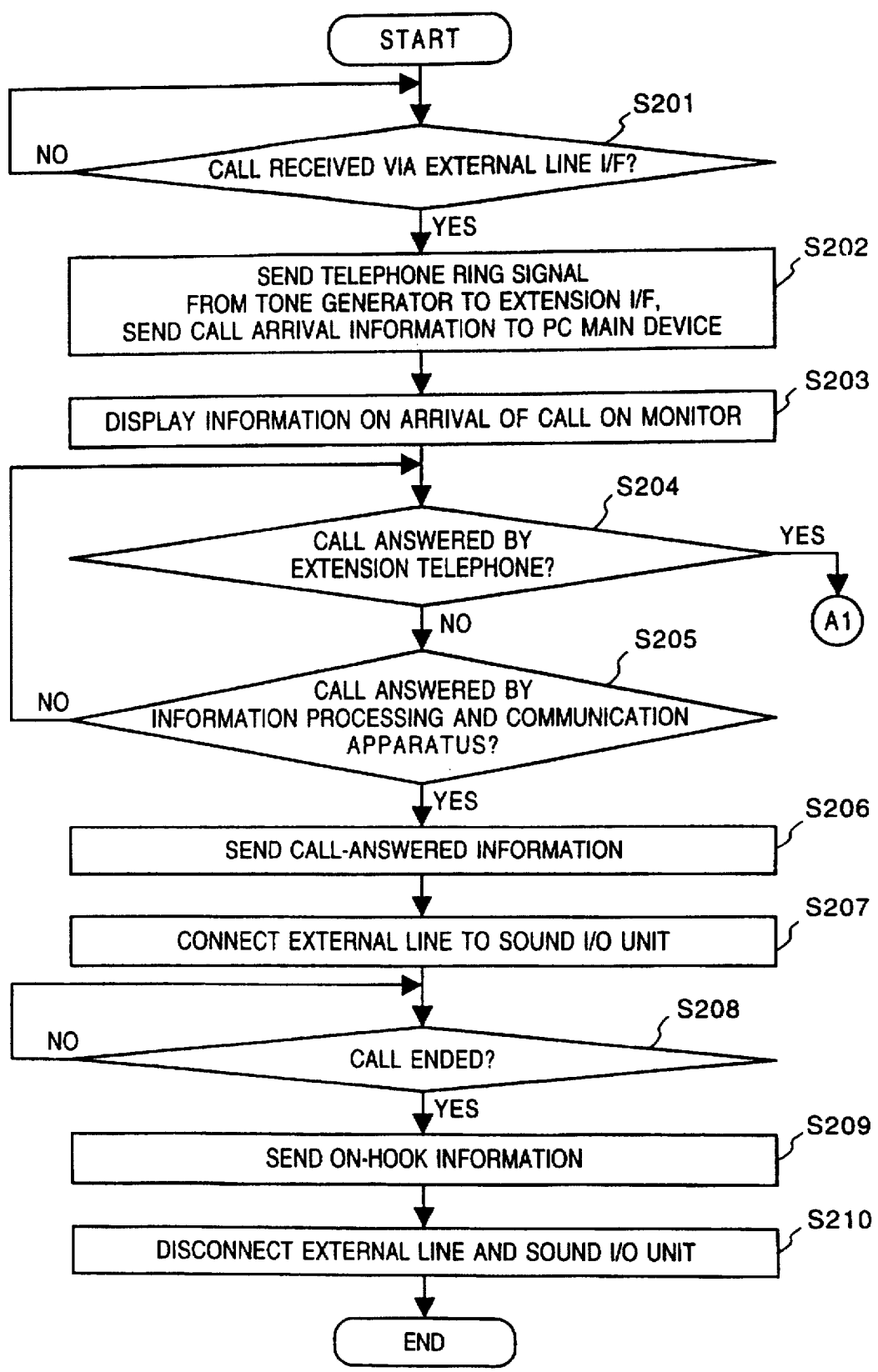
FIG. 2 is a flowchart showing answering operation of an external incoming call according to the first embodiment.
Figure 3:
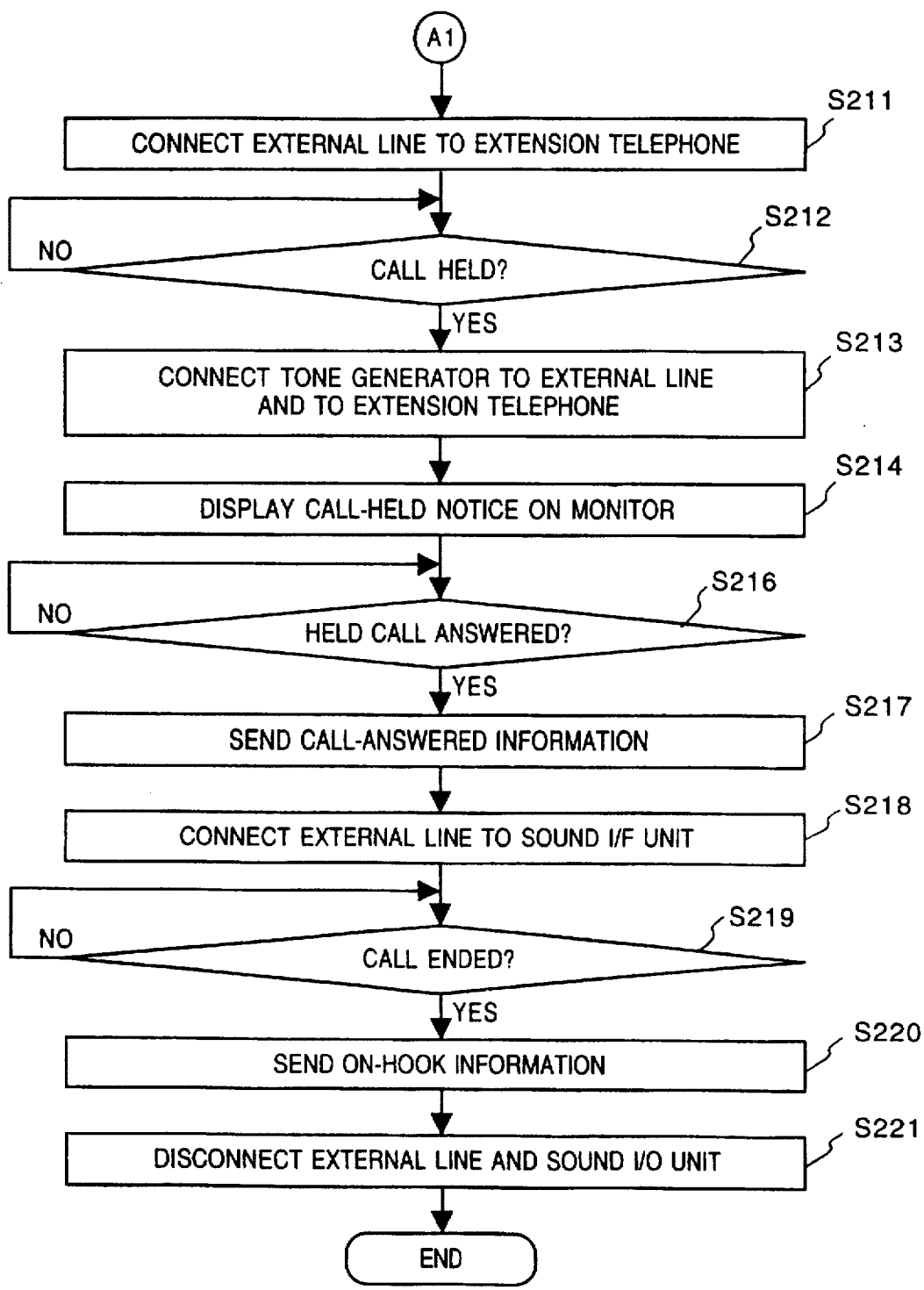
FIG. 3 is a flowchart showing termination operation of an external incoming call according to the first embodiment.

Referring to FIGS. 2 and 3, among various kinds of operations of the information processing and communication apparatus having the aforesaid configuration of the first embodiment, following two operations will be explained below; an operation to answer a call from an external telephone by using the information processing and communication apparatus and to hang up after the communication; and an operation of transmission of a call from an external telephone in which the call is answered by using an extension telephone first, then held, and finally answered by using the information processing and communication apparatus.

First, at step S201, whether or not a call has arrived via an external line 2 is determined by the external line I/F 102 of the extension board 1. If it has, the process proceeds to step S202, where the CPU 106 controls the exchange unit 101 so as to send a telephone ring sound signal generated by the tone generator 105 to the extension line I/F 103. Accordingly, an extension telephone 3 and the telephone circuit 104 ring to notify the arrival of the call. At the same time, the CPU 106 sends information on the arrival of a call (referred as "call arrival information", hereinafter) to the PC main device 5 via the ISA I/F 109.

At step S203, the PC main device 5 displays the information on the arrival of the call received via the external line 2 on the monitor 6 in accordance with the call arrival information by following the PC control program installed from the floppy disk drive 8.

Next at step S204, whether the call from the external line 2 is answered by one of the extension telephones 3 or not is determined. If the call is not answered by any of the extension telephones 3, then, whether the call should be answered by the information processing and communication apparatus or not is determined at step S205. At step S205, the PC main device 5 detects an operation of reception of the call from the external line 2 by an operator by using the mouse 10 on the monitor 6. If it is determined that the call should be answered by the information processing and communication apparatus, then at step S206, the PC main device 5 sends information indicating that the call has been answered by the information processing and communication apparatus (referred as "call-answered information", hereinafter) to the ISA I/F 109 of the extension board 1 via an ISA bus by following the PC control program.

Then at step S207, the CPU 106 controls the exchange unit 101 in accordance with the call-answered information so as to connect the external line 2 to the sound input/output unit 4, thereby it becomes communicable through the external line 2 and the sound input/output unit 4. At step S208, whether the call is terminated or not is determined. In order to terminate the call, the operator performs an operation to end a call (referred as "on-hook operation", hereinafter) on the monitor 6 by using a mouse 10, for example. When the PC main device 5 detects an input by the mouse 10 based on the on-hook operation, it is determined that the call is terminated at step S208. Next at step S209, the PC main device 5 sends information indicating the call is terminated (referred as "on-hook information", hereinafter) to the ISA I/F 109 of the extension board 1 via the ISA bus by following the PC control program.

Further at step S210, the CPU 106 controls the exchange unit 101 in accordance with the on-hook information so as to disconnect the external line 2 and the sound input/output device 4.

In contrast, if it is determined that the call is answered by one of the extension telephones 3 at step S204, then the process proceeds to step S211 in FIG. 3. When the extension line I/F 103 detects that one of the extension telephones 3 has answered the call, the CPU 106 controls the exchange unit 101 to connect the external line 2 to the extension telephone 3 at step S211.

At step S212, the CPU 106 determines whether the call is held by the extension telephone 3 or not by checking the extension I/F 103. If it is, at step S213, the CPU 106 controls the exchange unit 101 so as to connect the tone generator 105 which is generating a holding sound to the external line 2 as well as to connect the tone generator 105 simultaneously generating an extension calling sound signal to the extension telephone 3. Further, the CPU 106 sends information indicating that the call is held (referred as "call-held information", hereinafter) to the PC main device 5 via the ISA I/F 109.

At step S214, the PC main device 5 displays a notice showing the call is held on the monitor in accordance with the call-held information by following the PC control program. If a person who is making the call wishes to talk to an operator of the information processing and communication apparatus, the operator of the extension telephone 3 notifies the operator of the information processing and communication apparatus to answer the held call.

At step S216, whether or not the held call is answered by the information processing and communication apparatus is determined. In order to answer the call, the operator of the information processing and communication apparatus performs an operation to answer the call on the monitor 6 by using the mouse 10, for example, where the call is displayed that it is in a holding state on the monitor 6. When the PC main device 5 detects an input by the mouse on the basis of the aforesaid operation of answering the call and determines that the call is answered, then at step S217, the PC main device 5 sends call-answered information to the extension board 1 via the ISA bus by following the PC control program.

Next at step S218, the CPU 106 controls the exchange unit 101 on the basis of the call-answered information so as to connect the external line 2 to the sound input/output unit 4, thereby it becomes communicable through the external line 2 and the sound input/output unit 4. At step S219, whether the call is terminated or not is determined. In order to terminate the call, the operator performs the on-hook operation on the monitor 6 by using a mouse 10, for example. When the PC main device 5 detects an input by the mouse 10 on the basis of the on-hook operation and determines that the call is terminated, then at step S220, the PC main device 5 sends the on-hook information to the ISA I/F 109 of the extension board 1 via the ISA bus by following the PC control program.

At step S221, the CPU 106 controls the exchange unit 101 in accordance with the on-hook information so as to disconnect the external line 2 and the sound input/output device 4.

Figure 4:
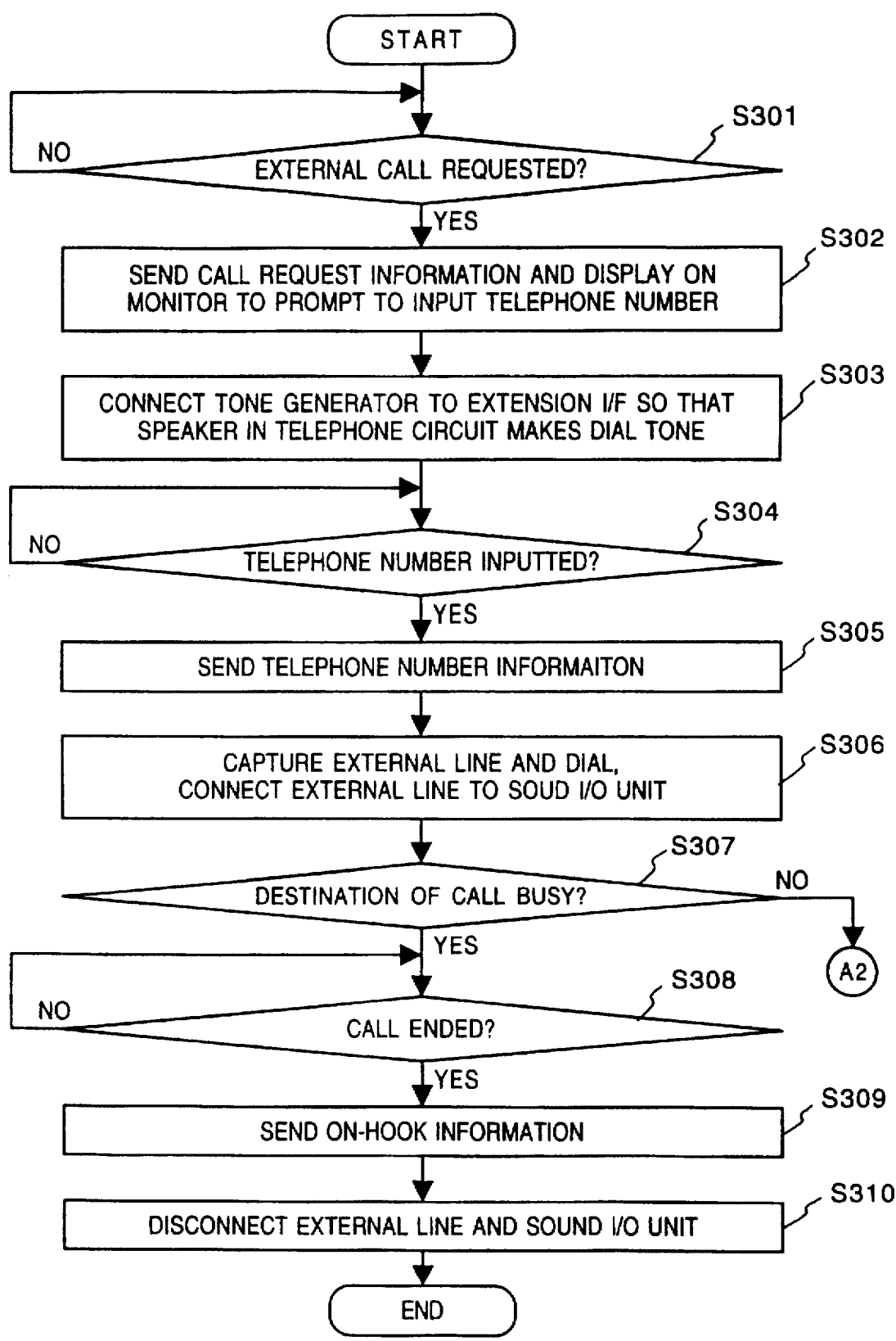
FIG. 4 a flowchart showing initiating operation of an external outgoing call according to the first embodiment.
Figure 5:
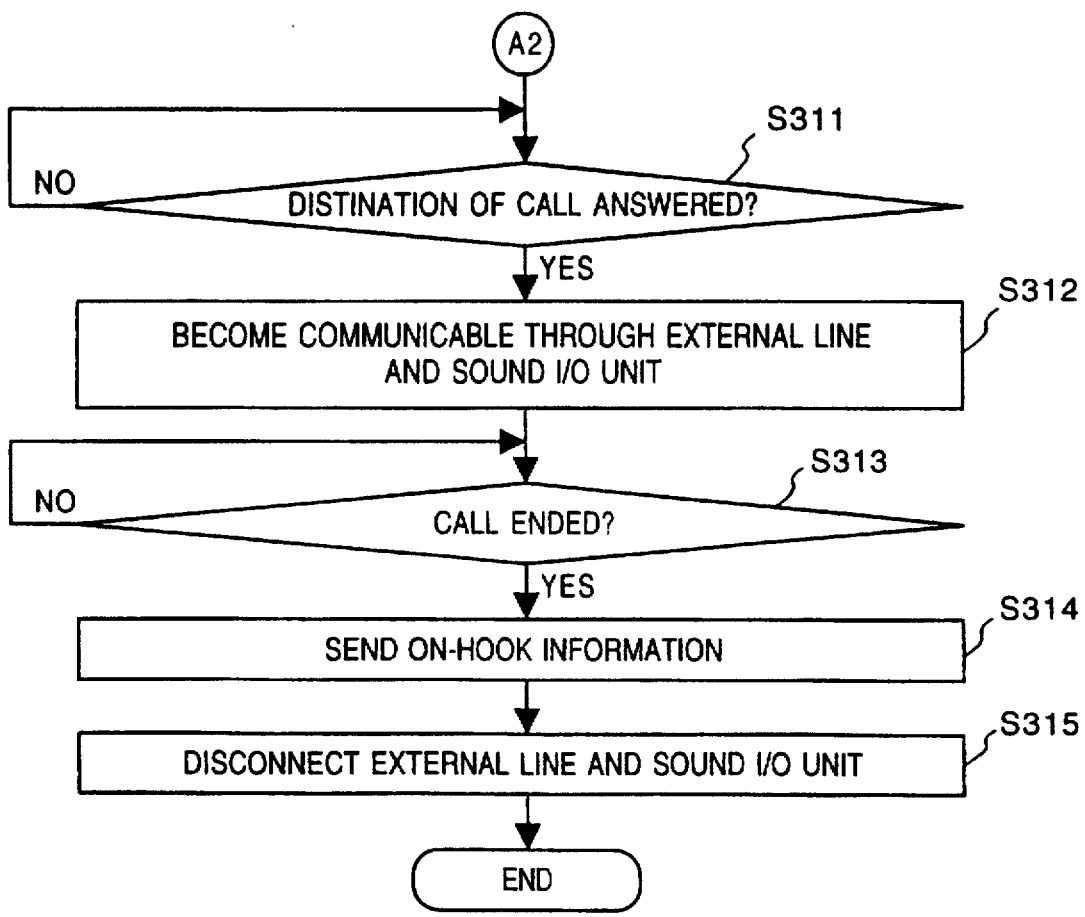
FIG. 5 a flowchart showing termination operation of an external outgoing call according to the first embodiment.

Next, referring to FIGS. 4 and 5, a calling operation is explained, that is, an operation to make a call to an external line and to end the call after finishing communication.

First at step S301, whether the information processing and communication apparatus requests to make a call via the external line (external outgoing call) or not is determined. In order to request to make an external outgoing call, the operator of the information processing and communication apparatus performs an operation for making an external outgoing call (referred as "external outgoing calling operation", hereinafter) on the monitor 6 by using a mouse 10, for example. When the PC main device 5 detects an input by the mouse 10 on the basis of the external outgoing calling operation and determines that the information processing and communication apparatus is requesting to make an external outgoing call, then at the step S302, the PC main device 5 sends information indicating request of external outgoing call (referred as "call request information", hereinafter) to the extension board 1 via the ISA bus by following the PC control program, and the monitor 6 displays to prompt the operator to input a telephone number.

Then, at step S303, the CPU 106 of the extension board 1 controls the exchange unit 101 in accordance with the call request information so as to connect the tone generator 105 generating dial tone to the extension line I/F 103. Accordingly, the dial tone is outputted from the speaker included in the telephone circuit 104.

Next at step S304, whether a telephone number is inputted or not is determined. The operator of the information processing and communication apparatus can input the telephone number from the keyboard, for example. When the PC main device 5 detects an input from the keyboard 9 and determines that the telephone number is inputted at step S304, the process proceeds to step S305 where the PC main device 5 sends the telephone number information to the extension board 1 via the ISA bus by following the PC control program.

Thereafter, at step S306, the CPU 106 of the extension board 1 controls the external line I/F 102 on the basis of the telephone number information so as to make the call by capturing the external line. Further, the CPU 106 controls the exchange unit 101 to connect the external line 2 to the sound input/output unit 4.

Next at step S307, whether the destination of the call is busy or not is determined. If it is busy, whether the call is terminated or not is determined at step S308. In order to terminate the call, an operator of the information processing and communication apparatus performs the on-hook operation on the monitor 6 by using a mouse 10, for example. If the PC main device 5 detects input by the mouse 10 based on the on-hook operation and determines that the operator terminated the call, then the process proceeds to step S309 where the PC main device 5 sends on-hook information to the extension board 1 via the ISA bus by following the PC control program.

Further at step S310, the CPU 106 controls the exchange unit 101 in accordance with the on-hook information so as to disconnect the external line 2 and the sound input/output device 4.

Whereas, if it is determined that the destination of the call is not busy at step S307, then the process proceeds to step S311 in FIG. 5. At step S311, whether or not the call is answered is determined. If it is, then the process moves to step S312 where the external line 2 and the sound input/output device 4 are placed in a communicable state.

Next at step S313, whether or not the call is terminated is determined. In order to terminate the call, an operator of the information processing and communication apparatus performs the on-hook operation on the monitor 6 by using a mouse 10, for example. If the PC main device detects input by the mouse 10 based on the on-hook operation and determines the call is terminated, then the process proceeds to step S314 where the PC main device 5 sends on-hook information to the extension board 1 via the ISA bus by following the PC control program. Further at step S315, the CPU 106 controls the exchange unit 101 in accordance with the on-hook information so as to disconnect the external line 2 and the sound input/output device 4.

In the aforesaid first embodiment, only an operation to answer a call from an external telephone by using the information processing and communication apparatus and an operation to make a call to an external telephone are described. However, it is apparent that various operations of service functions, such as to hold and transmit a call, answer a call substitutionally, and re-dialing, can be performed with better operability by using the information processing and communication apparatus of the first embodiment.

It should be noted that the PC main device 5 and the extension board 1 are connected via the ISA bus in the first embodiment, however, they can be connected via other kinds of buses depending on the type of PC, e.g., Nu bus, if the PC is a Macintosh computer. If the PC is an IBM computer, the bus to be used is not limited to the ISA bus, and PCI bus can be used.

According to the first embodiment as described above, by interchanging control information between central processing unit of a PC main device and a controller of an extension board, a monitor of the PC, a keyboard, a mouse, a microphone and a speaker provided on the extension board, and a sound input/output device of a sound input/output unit can be respectively made to function as display means, operation means, and sound input/output means of the key telephone, thereby providing an information processing and communication apparatus which serves as a telephone with better operability constructed by combining functions of a key telephone which connects to a plurality of external lines and extension lines, and functions of a PC having a good man-machine interface processing ability.

Further, in the first embodiment, by providing a CPU in the controller of the extension board, it is possible to disperse the load on the PC main device. Therefore, stable call exchange processing can be achieved without being affected by other applications which are under operation on the PC main device.

[Second Embodiment]

Figure 7:
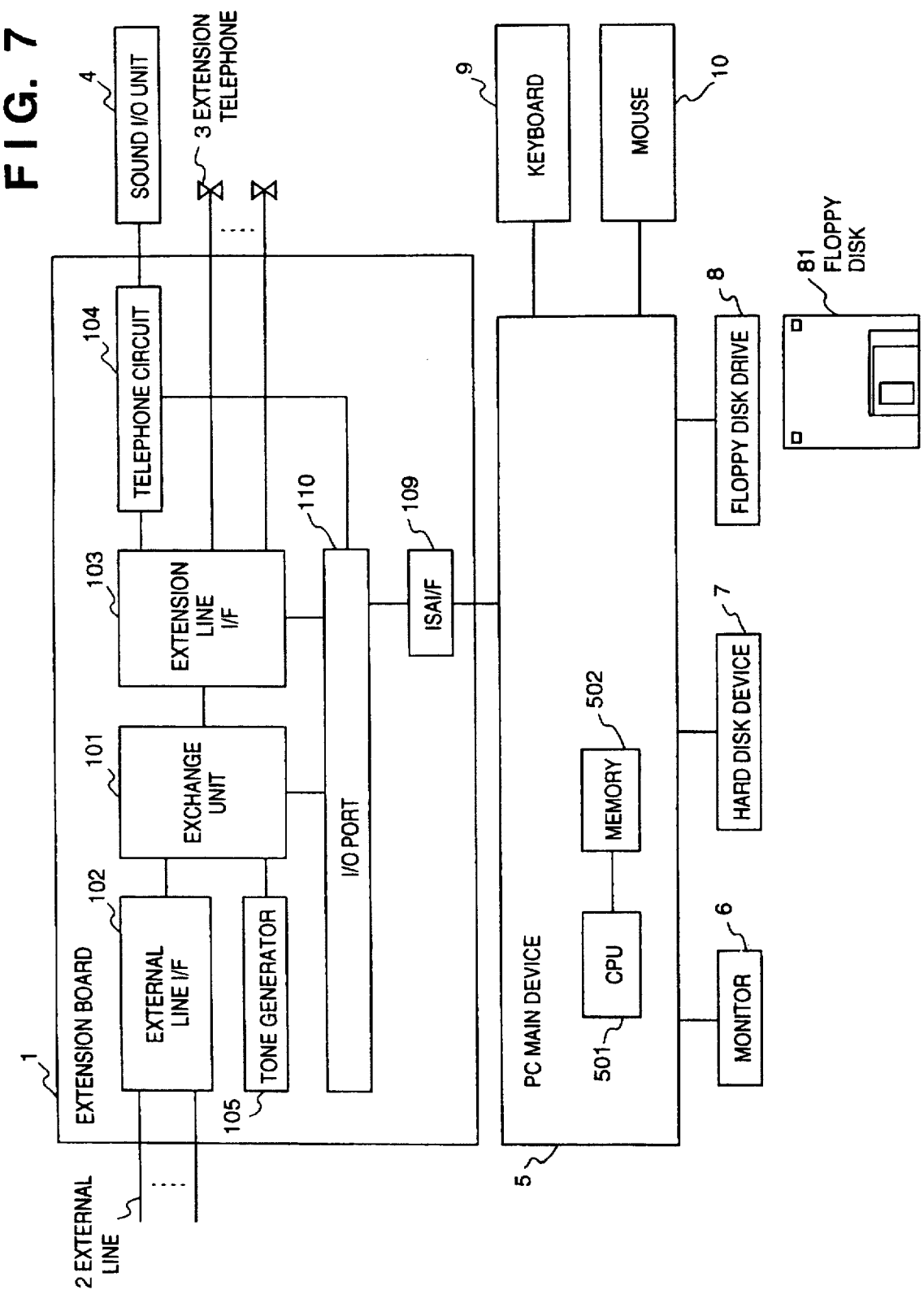
FIG. 7 is a block diagram illustrating a configuration of an information processing and communication apparatus according to a second embodiment of the present invention.

FIG. 7 is a block diagram illustrating a configuration of an apparatus according to a second embodiment.

In the aforesaid first embodiment, CPU, ROM, RAM are provided on the extension board as a control unit. In contrast, in the second embodiment, only an I/O port is used as a control unit of the extension board, and all the exchange processes are operated in accordance with an exchange/control program in a floppy disk installed in the PC main device.

In FIG. 7, only the element which differs from that of the first embodiment will be described. An I/O port 110 inputs/outputs control signals to/from each elements of the extension board 1, under control of the PC main device 5 via the ISA I/F 109. Regarding operations in the second embodiment, they are nearly identical to those in the first embodiment except an operation of the CPU of the extension board according to the first embodiment is performed by the CPU of the PC via the I/O port 110.

It should be noted that the PC main device 5 and the extension board 1 are connected via the ISA bus in the second embodiment, however, they can be connected via other kinds of buses depending on the type of PC, e.g., Nu bus, if the PC is a Macintosh computer. If the PC is an IBM computer, the bus to be used is not limited to the ISA bus, and PCI bus can be used.

According to the second embodiment as described above, by interchanging control information between central processing unit of a PC main device and a controller of an extension board, a monitor of the PC, a keyboard, a mouse, a microphone and a speaker provided on the extension board, and a sound input/output device of a sound input/output unit can be respectively made functioned as display means, operation means, and sound input/output means of the key telephone, thereby providing an information processing and communication apparatus which serves as a telephone with better operability constructed by combining functions of a key telephone which connects to a plurality of external lines and extension lines, and functions of a PC having a superior man-machine interface processing ability.

Further, according to the second embodiment, the central processing unit of the PC main device performs all the exchange processing control. Therefore, CPU, ROM and RAM on the extension board become unnecessary, thus it is possible to reduce cost of manufacturing the extension board.

[Other Embodiment]

The present invention can be applied to a system constituted by a plurality of devices (e.g., host computer, interface, reader, printer) or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 8. More specifically, program codes which correspond to external line control module, extension line control module, substitution control module, information interchange module, monitor and operation unit control module, and speech signal exchange module at least, are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An extension board, connected to a personal computer, for adding functions of a key telephone system to the personal computer by utilizing a monitor and an operation unit of the personal computer, said extension board comprising:

a first interface for connecting to an external line;

a telephone circuit for connecting to sound input/output means to make the personal computer serve as an extension telephone;

a second interface for connecting to a plurality of extension terminals;

an exchange circuit for connecting the external line to said telephone circuit or one of the plurality of extension terminals; and a third interface for receiving control information sent from a central processing unit of the personal computer in accordance with operation of the operation unit wherein said exchange circuit connects the external line to said telephone circuit for answering a call in accordance with the operation of the operation unit.

2. The extension board according to claim 1, wherein said first interface connects to a plurality of external lines.

3. An extension board according to claim 1 further comprising a processing circuit for processing information from the plurality of extension terminals.

4. The extension board according to claim 1, wherein said third interface receives control information from the central processing unit of the personal computer.

5. A personal computer comprising:

a first interface for connecting to an external line;

a telephone circuit for connecting to sound input/output means to perform as an extension telephone;

a second interface for connecting to a plurality of extension terminals;

an exchange circuit for connecting the external line to said telephone circuit or one of the plurality of extension terminals; and a data processing circuit for controlling said exchange circuit for making a call in accordance with operation of an operation unit of said personal computer used as operation means of a key telephone.

6. The personal computer according to claim 5, wherein said first interface connects to a plurality of external lines.

7. A computer program product comprising a computer medium having computer readable program code means embodied in said medium for providing functions of a key telephone by controlling a CPU of a personal computer including an exchange circuit which Provides functions of the key telephone, said product comprising:

first computer readable program code means for controlling an external line connected to the exchange circuit included in the personal computer;

second computer readable program control means for controlling a plurality of extension lines connected to the exchange circuit included in the personal computer;

third computer readable program code means for interchanging information between the exchange circuit and the CPU; and fourth computer readable program code means for utilizing an operation unit of the personal computer as operation means of the key telephone; and fifth computer readable program code means for controlling the exchange circuit for answering a call in accordance with operation of the operation unit.

8. The computer program product according to claim 7 further comprising sixth computer readable program code means for interchanging a speech signal among the external line, the plurality of extension lines, and an internal tone generator.

9. The computer program product according to claim 7, wherein said first computer readable program code means controls a plurality of external lines.

10. The computer program product according to claim 7 further comprising sixth computer readable program code means for displaying an image for operations as a key telephone on a monitor.

11. The computer program product according to claim 10, wherein the image for the operations on the monitor includes an operation for substitutional reception of a call.

12. A computer program product comprising a computer medium having computer readable program means embodied in said medium for controlling a personal computer including an exchange circuit which provides functions of a key telephone, said product including:

first computer readable program code means for interchanging information between the exchange circuit included in the personal computer and a CPU of the personal computer;

second computer readable program code means for utilizing an operation unit of the personal computer as operation means of the key telephone; and third computer readable program code means for controlling the exchange circuit for making a call in accordance with operation of the operation unit.

13. The computer program product according to claim 12 further comprising fourth computer readable program code means for displaying an image for the operations including an operation for substitutional answering of a call on a monitor.

14. A method for controlling a personal computer including an exchanging circuit which provides functions of a key telephone, comprising the steps of:

detecting an operation of an operation unit of the personal computer as operation means of the key telephone; and controlling the exchange circuit for answering a call in accordance with the operation of the operation unit.

15. The method according to claim 14, wherein the call is transmitted to sound input/output means connected to the personal computer in said controlling step.

16. The method according to claim 14, wherein the call from one of a plurality of extension lines is answered in the controlling step.

17. The method according to claim 14 further comprising a step of making a call to one of a plurality of extension terminals.

18. The method according to claim 14 further comprising a step of interchanging control information between the exchange circuit and a CPU of the personal computer.

* * * * *

UNITED STATES PATENT AND TRADEMARK OFFICE
CERTIFICATE OF CORRECTION

PATENT NO. : 5,757,898
DATED : May 26, 1998
INVENTOR(S) : SHIGERU NISHIKAWA

It is certified that error appears in the above-identified patent and that said Letters Patent is hereby corrected as shown below:

IN THE DRAWINGS

Sheet 4, FIG. 4, "SOUD I/O UNIT" should read
        --SOUND I/O UNIT"--; and
    Sheet 5, FIG. 5, "DISTINATION" should read --DESTINATION--.

COLUMN 1

Line 9, "(referred" should read --(referred to--;
    Line 11, "telephon" should read --telephone--; and
    Line 12, "have" should read --has--.

COLUMN 3

Line 63, "(referred" should read --(referred to--.

COLUMN 4

Line 16, "(referred" should read --(referred to--;
    Line 26, "(referred" should read --(referred to--;
    Line 32, "(referred" should read --(referred to--; and
    Line 54, "(referred" should read --(referred to--.

COLUMN 5

Line 39, "(referred" should read --(referred to--; and
    Line 47, "(referred" should read --(referred to--.

COLUMN 7

Line 25, "each" should read --each of the--; and
    Line 66, "be also" should read --also be--.

UNITED STATES PATENT AND TRADEMARK OFFICE
CERTIFICATE OF CORRECTION

PATENT NO. : 5,757,898
DATED     : May 26, 1998
INVENTOR(S) : SHIGERU NISHIKAWA

It is certified that error appears in the above-identified patent and that said Letters Patent is hereby corrected as shown below:

COLUMN 8

Line 17, "a part" should read --partial--;
    Line 35, "to" should read --to an--; and
    Line 63, "unit" should read --unit,--.

COLUMN 9

Line 29, "Provides" should read --provides--; and
    Line 39, "and" should be deleted.

Signed and Sealed this

Twenty-third Day of March, 1999

Attest:

Q. TODD DICKINSON

Attesting Officer     Acting Commissioner of Patents and Trademarks